United States Patent [19]

Vaccari

[11] 4,156,149
[45] May 22, 1979

[54] OPTICAL MATERIAL LEVEL PROBE

[75] Inventor: Fred A. Vaccari, Toronto, Canada

[73] Assignee: Honeywell Inc., Minneapolis, Minn.

[21] Appl. No.: 827,492

[22] Filed: Aug. 25, 1977

[30] Foreign Application Priority Data

Sep. 2, 1976 [CA] Canada .................................. 260450

[51] Int. Cl.² .......................................... G01N 21/26
[52] U.S. Cl. ....................................... 250/577; 73/293
[58] Field of Search ......................... 73/293; 250/577; 350/96.15, 96.19

[56] References Cited

U.S. PATENT DOCUMENTS

| | | | |
|---|---|---|---|
| 2,892,378 | 6/1959 | Canada | 356/208 X |
| 3,120,125 | 2/1964 | Vasel | 250/577 X |
| 3,895,235 | 7/1975 | Melone | 250/577 |
| 4,082,959 | 4/1978 | Nakashima | 250/577 |

FOREIGN PATENT DOCUMENTS

906609 9/1962 United Kingdom ............... 250/577 X

*Primary Examiner*—Lawrence J. Dahl
*Attorney, Agent, or Firm*—Trevor B. Joike

[57] ABSTRACT

An optical level detection probe is disclosed having first and second spaced apart optic guides, each guide having a 45° angle reflecting face or surface opposing one another such that light traveling along the first optic guide will reflect off of its 45° angle face, reflect off of the 45° angle face of the second optic guide, and travel along the second optic guide for detection by a sensor as long as the material is below the reflecting surfaces. When the material reaches the reflecting surfaces, the light will be blocked.

21 Claims, 7 Drawing Figures

OPTICAL MATERIAL LEVEL PROBE

BACKGROUND OF THE INVENTION

This invention relates to a probe for sensing the level of a material, particularly a liquid.

Although the invention is useful in sensing the levels of materials, such as liquids, in any type of application, the invention will be described in terms of sensing the filling of flammable fluids into tank trucks for purposes of explanation. When tank trucks used for hauling such fluids are filled, it is advantageous from a safety standpoint as well as from a control standpoint to sense the level of the liquid. Overfilling of such a vehicle involves not only waste but a danger of explosion resulting from sparks, static electricity or other forms of ignition. It would, of course, be possible for the operator of the filling pumps to make a visual survey of the liquid level of the tank. However, flammable liquid handling vehicles are often compartmentalized making visual observation of a plurality of tanks impossible or at least difficult. Also, there may not be the necessary personnel in attendance to supervise the filling operation. In many applications, therefore, it is necessary to automatically sense the level of fluid within a container to terminate the filling operation or to give an indication that the tank is full.

There are many types of optical probes known in the prior art for sensing the level of materials such as liquids. Such prior art probes usually suffer two deficiencies. First, a residue is left on the proble after the liquiid has been drained away. The residue causes the probe to see fluid which is not there. Second, the cost of assembly and manufacture of the present prior art optic probes can be substantial. One type of present probe employs fiber optic bundles to channel light to and from a prism. As long as the liquid being sensed is below the prism surface, light is reflected from one fiber optic element to a second fiber optic element. When liquid impinges upon the reflecting surfaces of the prism, the index of refraction at that surface changes and the light is not reflected to the second fiber optic element but is rather transmitted through the prism and into the liquid. The prism and fiber optic terminations are epoxied into a machined aluminum carrier. The aluminum carrier is supported by a phenolic or metal tube and the exposed fiber optic cables are encapsulated in a fuel resistant or liquid resistant epoxy. The complicated assembly processes used in making these optical probes result in an expensive prism sensor.

SUMMARY OF THE INVENTION

The invention is more economical and reliable by providing a dual refractive probe having first and second optic guides each of which has a 45° angle face or reflecting surface such that the light traveling along one guide is reflected by the 45° angle face to the reflecting face of the other guide which light when travels along the second guide. The optic guides are mounted in a space apart relationship with the 45° angle faces opposing one another so that light is reflected at both faces.

BRIEF DESCRIPTION OF THE DRAWINGS

These and other features and advantages will become apparent from a detailed consideration of the invention taken in conjunction with the drawings in which.

DETAILED DESCRIPTION OF THE INVENTION

Figure 1:
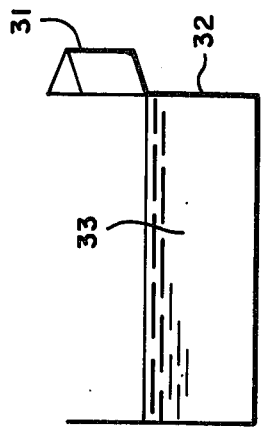
FIG. 1 is one form of prior art optical probe.

In FIG. 1, a prism 11 is shown with a single reflecting surface 18 oriented to sense the level of a liquid 12 within tank 13. A fiber optic element 14 transmits light from a source 15 to the prism 11 and a second fiber optic element 16 transmits reflected light to a photo-responsive sensor 17. As long as the liquid 12 is below reflecting surface 18, the light shown by a dotted line, will be reflected from source 15 to sensor 17. When the liquid impinges upon surface 18, the index of refraction at surface 18 will change and the light will pass into the liquid and will not be reflected to photo-responsive sensor 17.

Figure 2:
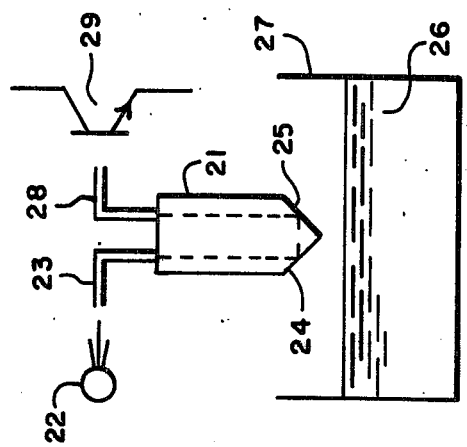
FIG. 2 is a second form of a prior art optical probe.

When the liquid 12 is drained out of tank 13 and away from reflecting surface 18, however, a residue of liquid can remain on the reflecting face or surface 18. When a second filling operation of the tank 13 is begun, therefore, the residue of fluid on surface 18 will result in light from source 15 transmitted by fiber optic element 14 passing through the reflecting surface 18 rather than being reflected and transmitted by fiber optic element 16 to photo-responsive sensor 17, even though the liquid is below surface 18. In order to eliminate the residue from surface 18, the prior art developed the type of device shown in FIG. 2.

A prismatic element 21 is optically connected to a source of light 22 by a first fiber optic element 23. The light is transmitted by prism 21 to reflecting surfaces 24 and 25 where, as long as the level of the liquid 26 within tank 27 is below the reflecting surfaces, it will be relected from surface 24 to 25 and then to photo-responsive sensor 29 by a second fiber optic element 28. Because the prism is oriented so that two reflecting surfaces are used with the adjacent edge between the two reflecting surfaces pointed downwards to the fluid, gravity will force any residue of fluid on the reflecting surfaces down to the point. However, a small bead or drop of fluid remains at the point and reduces the amount of light reflected and transmitted from first fiber optic elemment 23 to second fiber optic element 28. Furthermore, these devices, according to the prior art, are expensive to assemble and manufacture.

Figure 3:
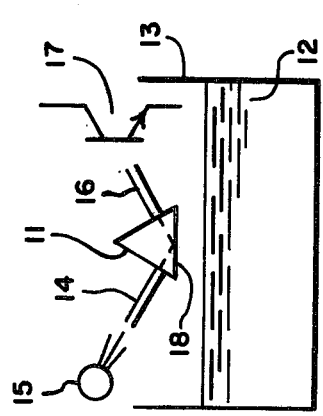
FIG. 3 is a third form of a prior art optical probe.

FIG. 3 shows another form of a prior art sensor which involves a prism 31 having its reflecting surface mounted in the wall of a tank 32 containing a fluid 33. This type of prior art device also suffers from many of the deficiencies of the prior art.

Figure 4:
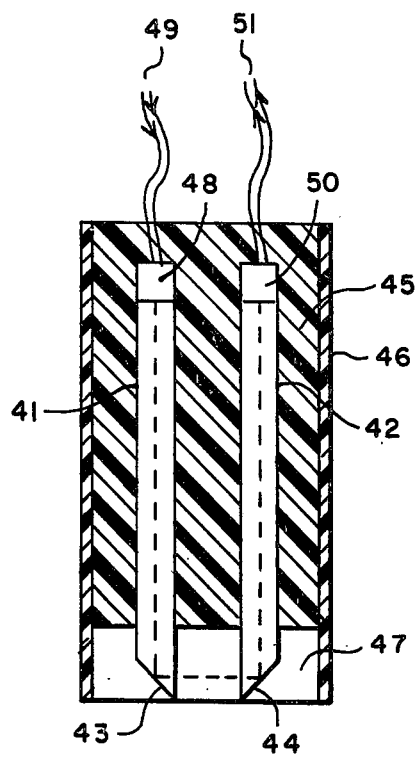
FIG. 4 is a cross-sectional view of an optical probe according to the present invention.

FIG. 4 shows an optical material level probe according to the present invention. A first light transmitting mechanism, in the form of optic guide 41, and a second light transmitting mechanism, in the form of optic guide 42, have 45° angle faces 43 and 44, respectively, for reflecting light, shown in dashed line in FIG. 4. These optic guides, although they may take any general shape, are preferably cylindrical. These guides are mounted in an epoxy support 45 around which is a phenolic or metal tube or cover 46. The cover 46 extends beyond the epoxy 45, as do the optic guides 41 and 42, to form a space 47 within which the reflecting surfaces 43 and 44 are located. The guides 41 and 42 maybe clad glad tubes, the cladding being glass having a lower index of refraction than the core glass material. The cladding is removed at the reflecting surfaces and lower cylindrical faces.

Light is supplied to the first optic guide 41 by a light source or LED 48 which is energized by a pair of leads 49. The light travels along the optic guide 41 and, as long as the level of the liquid which is being sensed is below the reflected surfaces 43 and 44, is reflected by surface 43. This reflected light is reflected again at face or surface 44 and travels along optic guide 42 to impinge upon a photo-responsive device 50 which converts the optical signal to an electrical signal which is taken out of the probe by wires 51.

Because the probe has dual optic guides and because reflecting surfaces 43 and 44 of the guides may be cut at a 45° angle through the entire width of the guide, any liquid which would otherwise tend to remain on the reflecting surface after the liquid has been drained out of the container in which the FIG. 4 probe is located tends to gravitationally drain off of the optic guides 41 and 42. If any liquid remains, it forms a very small drop or bead at the very point of the guides and does not interfere in any substantial way with the transmission of light from the source 48 to the sensor 50. In addition to the shape that the reflecting surfaces 43 and 44 take, the construction of the device shown in FIG. 4 aids in the draining of the liquid from the probe.

Figure 5:
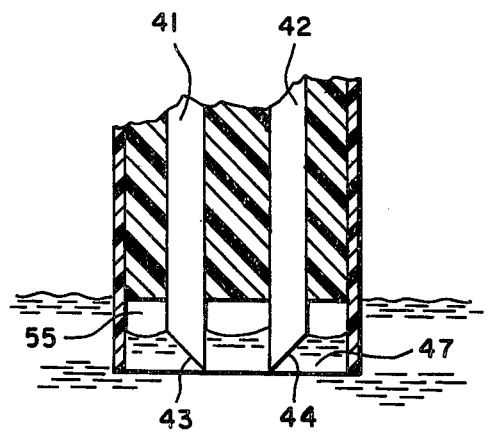
FIG. 5 shows a portion of the optical probe of FIG. 4.

This is shown more clearly in FIG. 5. When the liquid level rises and reaches a point where the reflecting surfaces 43 and 44 are immersed to cut off the light transmission from guide 41 to guide 42, an air pocket 55 is formed within the space 47. This small air pocket is trapped between the cover 46 and the epoxy support 45 thus limiting the amount of surface area of the guides 41 and 42 which come in contact with the liquid to facilitate drainage of the liquid off of optic guides 41 and 42. Also, when the liquid is removed the pressure of the air within the air gap 55 also tends to force the liquid off of the optic guides 41 and 42.

By placing source 48 and sensor 50 in intimate contact with optic guides 41 and 42, there are fewer coupling surfaces than in the prior art devices. In the prior art devices, the coupling surfaces would exist between the source and a first fiber optic element, the first fiber optic element and the prism, the prism and the second fiber optic element and the second fiber optic element and the sensor. By reducing the number of coupling junctions, the coupling losses are minimized and the need for expensive optical connectors are eliminated.

Moreover, opaque fluids may be sensed since they will block the transmission of light from guide 41 to guide 42 regardless of the index refraction of the fluid.

Figure 6:
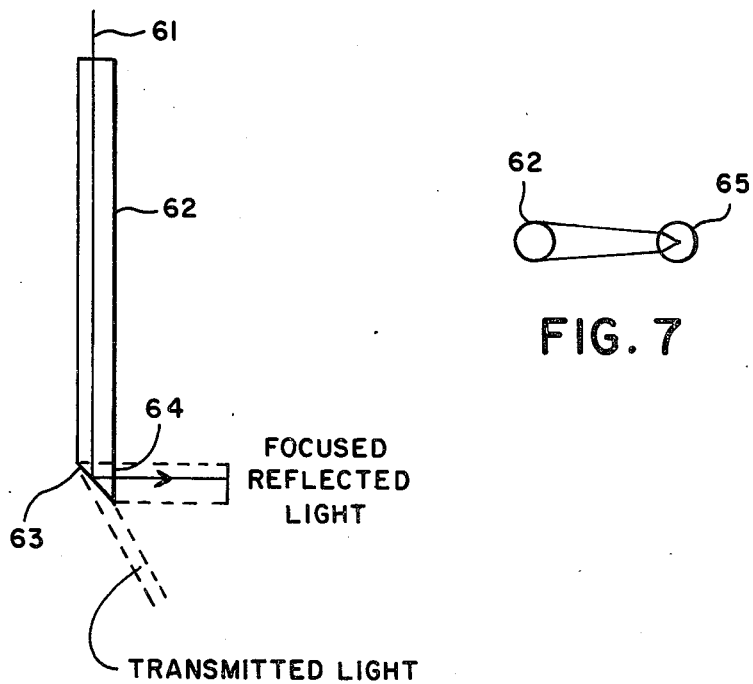
FIG. 6 shows one optic guide of the probe shown in FIGS. 4 and 5 and the light transmission therethrough; and, FIG. 7 shows the focusing aspect of the optic guides used in the probe of FIGS. 4 and 5.
Figure 7:
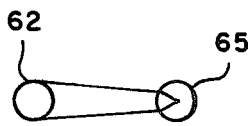

Cylindrical optic guides or rods are preferred since these rods tend to focus the light, thus culminating all available transmitted light into a sharp line. As a result, maximum available light is coupled between the guides permitting greater flexibility in assembly without performance degradation. Scattered and reflected losses are minimized. In FIGS. 6 and 7, the light 61 traveling along the optic guide 62 is reflected off surface 63 and focused by the convex nature of surface 64. This focused, reflected light is again focused by the other rod 65 into a sharp line onto the 45° angle face of the rod 65. Optical losses are thereby minimized.

The embodiments of the invention in which an exclusive property or right is claimed are defined as follows:

1. An optical probe for liquid level sensing comprising:
    first and second light transmitting means each having a reflecting face for reflecting light from said first light transmitting means to said second light transmitting means, said reflecting light ceasing when said liquid attains a predetermined level; and,
    mounting means for mounting said first and second light transmitting means in spaced apart relation and with said reflecting faces in a substantially opposing orientation.

2. The probe of claim 1 wherein said first and second light transmitting means comprises respective first and second elongated members each having first and second ends, said reflecting face of each of said first and second light transmitting means being formed at said second end of each of said first and second elongated members whereby light traveling along said first elongated member is reflected by said reflecting face at said second end of said first member and is again reflected at said reflecting face at said second end of said second elongated member to travel along said second elongated member when said material is not at a predetermined level.

3. The probe of claim 2 wherein said first and second members comprise respective first and second cylindrical optic guides.

4. The probe of claim 3 wherein said mounting means comprises support means to support said optic guides and cover means around said support means, said cover means extending beyond said support means at at least one end of said probe to form a space and said reflecting faces extending into said space.

5. The probe of claim 4 wherein said mounting means further comprises a source of light in intimate contact with said first end of said first optic guide and a light responsive device in intimate contact with said first end of said second optic guide.

6. The probe of claim 1 wherein said mounting means comprises support means to support said first and second light transmitting means and cover means around said support means, said cover means extending beyond said support means at at least one end of said probe to form a space and said reflecting faces extending into said space.

7. The probe of claim 6 wherein said mounting means further comprises a source of light in intimate contact with a first end of said first light transmitting means and a light responsive device in intimate contact with a first end of said second light transmitting means, said reflecting faces being formed at a second end of said first and second light transmitting means.

8. The probe of claim 1 wherein said mounting means further comprises a source of light in intimate contact with a first end of said first light transmitting means and a light responsive device in intimate contact with a first end of said second light transmitting means, said reflecting faces being formed at a second end of said first and second light transmitting means.

9. The probe of claim 1 wherein said reflecting face of each of said first and second light transmitting means is a substantially 45° angle.

10. The probe of claim 9 wherein said first and second light transmitting means comprises respective first and second elongated members each having first and second ends, said reflecting face of each of said first and second light transmitting means being formed at said second end of each of said first and second elongated members whereby light traveling along said first elongated member is reflected by said reflecting face at said second end of said first member and is again reflected at said reflecting face at said second end of said second elongated member to travel along said second elongated member when said material is not at a predetermined level.

11. The probe of claim 10 wherein said first and second members comprise respective first and second cylindrical optic guides.

12. The probe of claim 11 wherein said mounting means comprises support means to support said optic guides and cover means around said support means, said cover means extending beyond said support means at at least one end of said probe to form a space and said reflecting faces extending into said space.

13. The probe of claim 12 wherein said mounting means further comprises a source of light in intimate contact with said first end of said first optic guide and a light responsive device in intimate contact with said first end of said second optic guide.

14. The probe of claim 9 wherein said mounting means comprises support means to support said first and second light transmitting means and cover means around said support means, said cover means extending beyond said support means at at least one end of said probe to form a space and said reflecting faces extending into said space.

15. The probe of claim 14 wherein said mounting means further comprises a source of light in intimate contact with a first end of said first light transmitting means and a light responsive device in intimate contact with a first end of said second light transmitting means, said reflecting faces being formed at a second end of said first and second light transmitting means.

16. The probe of claim 9 wherein said mounting means further comprises a source of light in intimate contact with a first end of said first light transmitting means and a light responsive device in intimate contact with a first end of said second light transmitting means, said reflecting faces being formed at a second end of said first and second light transmitting means.

17. An optical liquid level probe comprising:
first and second optic guides each having first and second ends, said second end of each of said optic guides forming a substantially 45° angle reflecting face; and,
mounting means for mounting said first and second optic guides in sapced apart relation and with said reflecting faces in substantially opposing relation such that light traveling along said first optic guide is reflected by said 45° angle face at said second end of said first optic guide and reflected again by said 45° angle face at said second end of said second optic guide to travel along said second optic guide, said reflecting light ceasing when said liquid attains a predetermind level.

18. The probe of claim 17 wherein said optic guides are elongated cylindrical optic guides.

19. The probe of claim 18 wherein said mounting means comprises support means to support said optic guides and cover means around said support means, said cover means extending beyond said support means at at least one end of said probe to form a space and said 45° angle faces extending into said space.

20. The probe of claim 19 wherein said mounting means further comprises a source of light in intimate contact with said first end of said first optic guide and a light responsive device in intimate contact with said first end of said second optic guide.

21. The probe of claim 17 wherein said mounting means comprises support means to support said optic guides and cover means around said support means, said cover means extending beyond said support means at at least one end of said probe to form a space and said 45° angle faces extending into said space.

* * * * *

UNITED STATES PATENT OFFICE
CERTIFICATE OF CORRECTION

PATENT NO. : 4,156,149
DATED : May 22, 1979
INVENTOR(S) : Fred A. Vaccari

It is certified that error appears in the above-identified patent and that said Letters Patent are hereby corrected as shown below:

On cover page cancel "Honeywell Inc., Minneapolis, Minn." as Assignee and substitute --Honeywell Ltd., Scarborough, Ontario, Canada--.

Signed and Sealed this

Fourth Day of March 1980

[SEAL]

Attest:

SIDNEY A. DIAMOND

Attesting Officer

Commissioner of Patents and Trademarks